United States Patent [19]
Green et al.

[11] Patent Number: 5,316,635
[45] Date of Patent: May 31, 1994

[54] ZIRCONIUM ISOTOPE SEPARATION USING TUNED LASER BEAMS

[75] Inventors: Lawrence W. Green, Deep River; Glenn McRae, Point Alexander, both of Canada

[73] Assignee: Atomic Energy of Canada Limited/Energie Atomique du Canada Limitee, Ottawa, Canada

[21] Appl. No.: 886,943

[22] Filed: May 22, 1992

[51] Int. Cl.$^5$ .............................................. B01D 5/00
[52] U.S. Cl. ............................ 295/157.22; 204/157.2; 204/157.21; 423/DIG. 7; 250/423 P
[58] Field of Search ........ 204/157.22; 423/2, DIG. 7; 250/423 P

[56] References Cited

U.S. PATENT DOCUMENTS

| | | | |
|---|---|---|---|
| 4,351,707 | 9/1982 | Turro | 204/158 R |
| 4,490,225 | 12/1984 | Lahoda et al. | 204/158 R |
| 4,567,025 | 1/1986 | Peterson et al. | 204/157.2 |
| 4,584,072 | 4/1986 | Arisawa et al. | 204/157.22 |
| 4,584,073 | 4/1986 | Lahoda et al. | 204/157.2 |
| 4,612,097 | 9/1986 | Jackovitz et al. | 204/157.2 |
| 4,690,742 | 9/1987 | Cantrell et al. | 204/157.2 |
| 4,704,197 | 11/1987 | Trajmar | 204/157.22 |
| 4,767,513 | 8/1988 | Peterson et al. | 204/157.21 |
| 4,793,907 | 12/1988 | Paisner et al. | 204/157.22 |
| 5,202,005 | 4/1993 | Paisner et al. | 204/157.22 |

FOREIGN PATENT DOCUMENTS

| | | |
|---|---|---|
| 974190 | 9/1975 | Canada . |
| 991119 | 6/1976 | Canada . |
| 994009 | 7/1976 | Canada . |
| 1015692 | 8/1977 | Canada . |
| 1024468 | 1/1978 | Canada . |
| 1027516 | 3/1978 | Canada . |
| 1033317 | 6/1978 | Canada . |
| 1044640 | 12/1978 | Canada . |
| 1045581 | 1/1979 | Canada . |
| 1061476 | 8/1979 | Canada . |
| 1067452 | 12/1979 | Canada . |
| 1082128 | 7/1980 | Canada . |
| 1085343 | 9/1980 | Canada . |
| 1107232 | 8/1981 | Canada . |
| 1119123 | 3/1982 | Canada . |
| 1173054 | 8/1984 | Canada . |

OTHER PUBLICATIONS

Inst. Phys. Conf. Ser. No. 114:Section 2, Paper presented at RIS 90, Varese, Italy, Sep. 1990, pp. 113–116.
Inst. Phys. Conf. Ser. No. 114:Section 5, Paper presented at RIS 90, Varese, Italy, Sep. 1990, pp. 243–246.
The American Physical Society, vol. 42, No. 1, Jul. 1990, pp. 543–549.
J. Phys. B:AT. Mol. Opt. Phys., 23, pp. 2945–2956 (1990).
Physical Review A, vol. 40, No. 4, Aug. 15, 1989, pp. 2199–2202.
Inst. Phys. Conf. Ser. No. 94:Section 1, Paper presented at RIS 88, Gaithersburg, Md., Apr. 1988, pp. 41–47.
JETP Lett., vol. 33, No. 9, May, 1981, pp. 450–453.

Primary Examiner—Donald P. Walsh
Assistant Examiner—Ngoclan T. Mai
Attorney, Agent, or Firm—Sughrue, Mion, Zinn, Macpeak & Seas

[57] ABSTRACT

A method for selectively photoionizing odd mass Zr atoms. Atomic vapours are subjected to three resonant and are non resonant laser pulses to raise the energy of Zr atoms from the J=2 ground state, to a J=1 first intermediate state, to a J=(second intermediate state and to a third intermediate state prior to ionization. Quantum mechanical selection rules applicable to linearly polarized light and hyperfine interactions are exploited to produce odd mass selectivity 21 Claims, 4 Drawing Sheets

ZIRCONIUM ISOTOPE SEPARATION USING TUNED LASER BEAMS

BACKGROUND OF THE INVENTION

Zirconium is commonly used for forming fuel cladding, pressure tubing and other components of nuclear reactors. Zirconium is useful for such applications because of its relatively low neutron capture cross-section. The neutron capture cross-section of natural zirconium is dominated by the $^{91}$Zr isotope. The fuel economy of a nuclear reactor can be greatly improved by using $^{91}$Zr depleted zirconium in place of natural zirconium. Reduction of $^{91}$Zr in natural zirconium, containing typical alloying impurities, from its natural abundance of about 11% to 3% corresponds to a reduction in effective cross-section from 0.244 barns to 0.15 barns. Further reduction of $^{91}$Zr to 1% corresponds to a reduction in effective cross-section to 0.12 barns. The use of $^{91}$Zr depleted zirconium not only allows improved fuel efficiency, but also allows the use of thicker pressure and calandria tubes reducing tube sag and increasing safety margins. As a result, a substantial saving in the costs of retubing reactors can be realized.

Techniques exist for isotopically selective excitation and ionization of various elements. Enrichment of the uranium isotope, $^{235}$U, for nuclear power plant fuel can be achieved by atomic vapour laser isotope separation (U-AVLIS). In the U-AVLIS process, uranium metal is heated to over 2000° C. to form dense atomic vapours. Dye laser beams, tuned to excite preferentially and ionize the $^{235}$U isotope, are passed through the atomic vapours. The ions, enriched in $^{235}$U are electrostatically separated from the depleted neutrals and collected. The isotopic selectivity obtained in the U-AVLIS process is very high, e.g. $>10^4$, because the spectral shifts between the $^{235}$U and $^{238}$U isotopes are much larger than the laser bandwidths. The lasers are precisely tuned to the frequency of the $^{235}$U transition to excite selectively and ionize this isotope. This approach is not practical for Zr because the isotope shifts are much smaller than the bandwidths of the lasers typically used for U-AVLIS. While lasers of sufficient resolution are available, they are characterized by very low power and hence produce unacceptably low yields for a practical $^{91}$Zr depletion process.

As a result, techniques for $^{91}$Zr depletion that do not depend on isotope shift discrimination have been proposed. U.S. Pat. No. 4,389,292, Phillips et al. issued Jun. 21, 1983 discloses a photochemical process for separating $^{91}$Zr by raising a zirconium chelate ligand from a ground state to an activated state in the presence of a scavenger which reacts with the ligand in the activated state but not in the ground state and separating out the reacted ligand. U.S. Pat. No. 4,584,073, Lahoda et al. issued Apr. 22, 1986 discloses a process for separating $^{90}$Zr by coating small bead particles with a zirconium compound such as zirconium tetrachloride and photo-exciting said zirconium compound to cause a reaction of one isotope compound thereof with a scavenger gas.

Non-chemical processes for separating odd from even atomic weight isotopes using polarization selection rules are also known. In a paper entitled "Use of Angular-Momentum Selection Rules for Laser Isotope Separation", Appl. Phys. Lett. 29, 411 (1976), Balling and Wright discuss a technique for isotope-selective laser excitation of atoms which exploits the angular-momentum selection rules for the absorption of circularly polarized light. Resolved hyperfine levels are populated by stepwise excitation with two circularly polarized lasers tuned to the appropriate absorption lines. The Balling and Wright technique is stated to be effective for group III atoms and Yb. This technique requires strong hyperfine interaction and resolvable hyperfine levels. For zirconium, which has an atomic ground state of $J=2$, weak hyperfine interaction and many unresolvable hyperfine levels, the Balling and Wright technique will not work efficiently. The ground state is characterized by a population of zirconium diluted over many hyperfine levels, only one of which can be accessed at a time.

In U.S. Pat. No. 4,020,350, Ducas issued Apr. 26, 1977, there is described a method for the selective excitation of odd atomic weight isotopes employing two pulsed lasers having the same handedness of circular polarization. The first laser pulse creates a coherent superposition state in an intermediate level. After the laser pulse is terminated, resonance oscillation due to hyperfine structure causes the population of the odd atomic weight isotope to be redistributed whereas the population of the even atomic weight isotope is not. According to selection rules, a second laser pulse having the same handedness of circular polarization can excite the redistributed odd atomic weight isotopes out of the intermediate state into a high lying level from which the atoms can be ionized. Although the Ducas method is described as being valid for a wide variety of more complex level structures, it is clear that such method applies only for states having relatively low J and I. This is because the Ducas method requires that the time between application of the laser pulses be set at $t=\pi/\Delta\omega$ where $\Delta\omega$ is the characteristic period of the frequency splitting. For zirconium which has a $I=5/2$ and a $J=2$ ground state, there exist a multiplicity $(2J+1)(2I+1)$ of $\Delta\omega$'s which interfere in such a way that there is no single definable W. The result is that the Ducas method would likely produce unacceptably low separation factors when applied to zirconium.

In a paper entitled "Effect of a Magnetic Field on the Resonant Multistep Selective Photoionization of Gadolinium Isotopes", Optics Communications, Vol. 76, No. 1, Apr. 1, 1990, Guyadec et al. disclose a multistep photoionization process for separating odd and even isotopes of gadolinium. Guyadec et al. selectively photoionizes odd isotopes ($^{155}$Gd, $^{157}$Gd), but requires the use of an autoionizing level. This level is very susceptible to external electric and magnetic fields and Helmholtz coils are required to control the magnetic field. In hostile environments typical of apparatus used to generate atomic vapours for separation, such as in an electron beam furnace, interfering electric and magnetic fields are practically difficult or impossible to control. Such fields redistribute the sublevel populations in the even isotope and destroy selectivity.

In a paper entitled "Selective ionization of Ba and Sr isotopes based on a two photon interference effect", Physical Review A, Vol. 42, No. 1, Jul. 1, 1990, Park and Diebold disclose the selective ionization of non-zero-spin atoms relative to zero-spin atoms. Park and Diebold use a two-photon resonant sequence stated to be effective for separating Ba and Sr isotopes.

None of the above discussed references discloses a method for selective photo excitation and ionization of $^{91}$Zr from natural zirconium suitable for production purposes.

SUMMARY OF THE INVENTION

It is an object of the present invention to provide a method for selectively photoionizing odd mass Zr atoms in a vapour comprising even and odd mass Zr atoms.

It is a further object of the present invention to provide a method for enhancing selectivity of odd mass Zr atom photoionization.

The method of the invention utilizes multiple resonant photons to photoionize selectively the odd mass Zr atoms in a vapour comprising even and odd mass Zr atoms. The invention uses quantum mechanical selection rules applicable to linearly polarized light to prepare an intermediate state which includes a magnetic sublevel in which the even mass Zr atoms are substantially unrepresented and hyperfine interactions to establish a substantially isotropic distribution of odd mass Zr atoms in the magnetic sublevels of said intermediate state. Quantum mechanical selection rules are exploited to prevent further excitation of the even isotope. The odd mass Zr atoms are excited out of the intermediate state and ionized.

According to one aspect of the present invention, there is provided a method for selectively photoionizing odd mass Zr atoms in a vapour comprising odd and even mass Zr atoms, comprising the steps of: irradiating said vapour with a linearly polarized resonant first laser pulse at a wavelength effective to raise the energy of Zr atoms from the $J=2$ ground state to a $J=1$ first intermediate state; irradiating said vapour with a linearly polarized resonant second laser pulse at a wavelength effective to raise the energy of Zr atoms by a transition from said $J=1$ first intermediate state to a $J=1$ second intermediate state in which the $m=0$ sublevel is substantially unpopulated with even mass Zr atoms, said transition having sufficient hyperfine interaction to establish a substantially isotropic population distribution of odd mass Zr atoms among the magnetic sublevels of said $J=1$ second intermediate state; irradiating said vapour with a linearly polarized resonant third laser pulse at a wavelength effective to raise the energy of Zr atoms from said $J=1$ second intermediate state to a third intermediate state; irradiating said vapour with electromagnetic radiation effective to ionize Zr atoms in said third intermediate state.

According to another aspect of the present invention, there is provided a method for selectively photoionizing odd mass Zr atoms in a vapour comprising odd and even mass Zr atoms comprising the steps of: irradiating said vapour with a linearly polarized first laser pulse at a wavelength effective to raise the energy of Zr atoms from the $J=2$ ground state to a $J=1$ first intermediate state at 17429.86 cm$^{-1}$; irradiating said vapour with a linearly polarized second laser pulse at a wavelength effective to raise the energy of Zr atoms from said $J=1$ first intermediate state to a $J=1$ second intermediate state at 35046.95 cm$^{-1}$; irradiating said vapour with a linearly polarized third laser pulse having an axis of polarization substantially parallel to that of said second laser pulse and at a wavelength effective to raise the energy of Zr atoms from said $J=1$ second intermediate state to a $J=0$ third intermediate state at 52604.5 cm$^{-1}$; irradiating said vapour with electromagnetic radiation effective to ionize Zr atoms in said $J=0$ third intermediate state.

According to another aspect of the present invention, there is provided a method for selectively photoionizing odd mass Zr atoms in a vapour comprising odd and even mass Zr atoms comprising the steps of: irradiating said vapour with a linearly polarized first laser pulse of a wavelength effective to raise the energy of Zr atoms from the $J=2$ ground state to a $J=1$ first intermediate state at 17429.86 cm$^{-1}$; irradiating said vapour with a linearly polarized second laser pulse at a wavelength effective to raise the energy of Zr atoms from said $J=1$ first intermediate state to a $J=1$ second intermediate state at 35046.95 cm$^{-1}$; irradiating said vapour with a linearly polarized third laser pulse having an axis of polarization substantially perpendicular to that of said second laser pulse and at a wavelength effective to raise the energy of Zr atoms from said $J=1$ second intermediate state to a $J=1$ third intermediate state at 52502.2 cm$^{-1}$; irradiating said vapour with electromagnetic radiation effective to ionize Zr atoms in said $J=1$ third intermediate state.

BRIEF DESCRIPTION OF THE DRAWINGS

These and other features of the present invention are more fully set forth below in the accompanying detailed description, presented solely for purposes of exemplification and not by way of limitation, and in the accompanying drawings, of which.

DETAILED DESCRIPTION OF THE INVENTION

Figure 1:
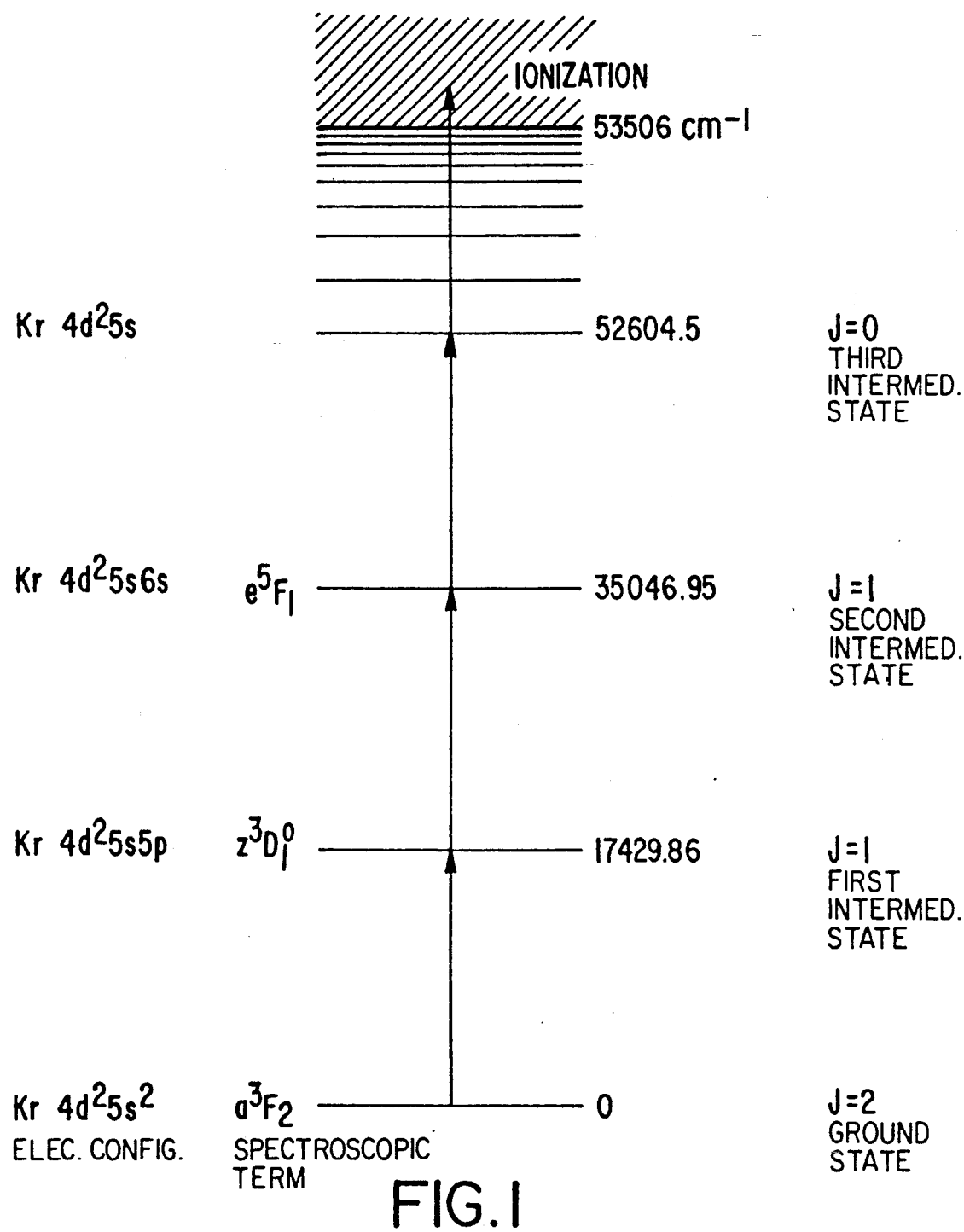
FIG. 1 is an energy level and transition diagram of an excitation path of the present invention.

FIG. 1 shows exemplary energy states employed in achieving selective photoionization of odd mass Zr atoms in accordance with one aspect of the present invention. The ground energy state of zirconium is defined as the zero energy level and has a total electronic angular momentum quantum number of $J=2$. From the ground level the zirconium atoms are excited to a first intermediate energy state at 17429.86 cm$^{-1}$ by a first resonant photon tuned to 573.7 nm. This first intermediate state has a total electronic angular momentum quantum number of $J=1$. From this first intermediate state, the zirconium atoms are excited to a second intermediate energy state at 35046.95 cm$^{-1}$ by a second resonant photon tuned to 567.6 nm. This second intermediate state also has a total electronic angular momentum quantum number of $J=1$. From this second intermediate state, the zirconium atoms are excited to a third intermediate energy state at 52604.5 cm$^{-1}$ by a third resonant photon tuned to 569.6 nm. This third intermediate state has a total electronic angular momentum quantum number of $J=0$. Isotopic selection in favour of odd mass Zr atoms occurs in the transition between the J=1 second intermediate state and the J=0 third intermediate state. From this third intermediate state, the odd mass Zr atoms are excited through the ionization continuum at 53506 cm$^{-1}$, for example by a fourth non-resonant photon characterized by a wavelength of not greater than about 10,000 nm.

Figure 2:
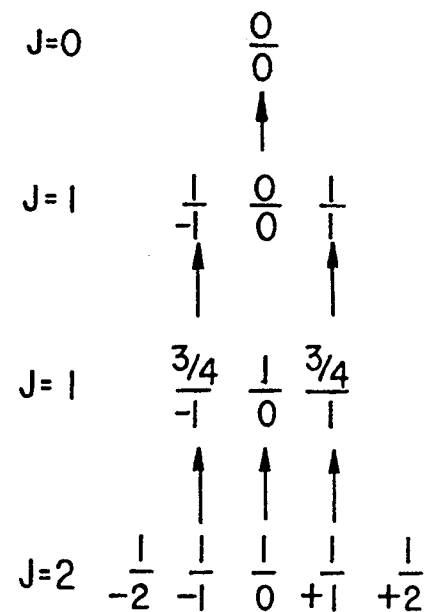
FIG. 2 is an energy level and transition diagram applicable to even isotopes useful in explaining the present invention.

FIG. 2 shows schematically the magnetic sublevels associated with each of the energy states through which the even mass isotopes are excited in the excitation path described in FIG. 1, and the relative populations in each sublevel.

The following theoretical analysis represents a current understanding of the operation of the present invention, but is not intended to limit the scope or validity thereof. The theoretical analysis is directed to the excitation path described in FIGS. 1 and 2, but those skilled in the art will understand that it applies generally to other excitation paths within the scope of the present invention.

The oscillating electric field of the linearly polarized first laser beam causes the electronic angular momentum of the atoms to become quantized with respect to the electric field axis. The J=2 ground state for zirconium has 2J+1=5 magnetic sublevels m=−2, −1, 0, +1, and +2. The population distribution in the sublevels of even mass Zr atoms is isotropic as represented by the numeral 1 in each of the ground state sublevels shown in FIG. 2.

With the first photon tuned to 573.7 nm, a resonant electric dipole transition to the J=1 first intermediate energy state will take place. In the incoherent regime, in which the Einstein rate equations apply, excited state populations P(J,M), prepared by resonant transitions with linearly polarized lasers, are described by the equation:

$$P(J,M) \propto \sum_m |d^J_{Mm}(\theta_{12})|^2 \begin{pmatrix} j & 1 & J \\ -m & 0 & M \end{pmatrix}^2 P(j,m) \quad (I)$$

Where P(j,m) is the population of substate m of initial state j, the large bracketed term is the 3j symbol for the resonant transition, and the term $d^J_{Mm}(\theta_{12})$ is the reduced rotation matrix element. The laser polarization axis is taken to be the axis of reference (Z axis). Coherences are assumed to be negligible due to Doppler broadening, excited state decay, and the use of low intensity, multimode laser light. Quantum mechanical selection rules dictate that for linearly polarized light, the transition must occur only between magnetic sublevels having the same value of m and the relative transition strengths are given by the 3j symbol. In FIG. 2, the population of even mass Zr atoms in the J=1 first intermediate state is distributed in a ratio of $\frac{3}{4}$, 1, and $\frac{3}{4}$ for the −1, 0 and +1 magnetic sublevels respectively.

The second photon tuned to 567.6 nm, induces a resonant transition to the J=1 second intermediate energy state. The transition occurs between magnetic sublevels having the same value m and the transition strengths vary as m$^2$. Therefore, for the transition from the J=1 first intermediate state to the J=1 second intermediate state, the m=1 and m=−1 even mass Zr populations will be transmitted equally but the m=0 sublevel population will be excluded. The result is the preparation of an aligned state for which even mass Zr population in the m=0 sublevel is absent. In FIG. 2, the population of even mass Zr atoms in the J=1 second intermediate state is distributed in a ratio of 1, 0 and 1 for the −1, 0 and +1 sublevels respectively. This anisotropic distribution is long-lived relative to the photoexcitation time scale, because its lifetime is determined by the atomic collision frequency which is less than 1 per 100 ns at the vapour densities required for the process of this invention.

The third photon tuned to 569.6 nm induces a resonant transition to the J=0 third intermediate energy state. Because the 0 magnetic sublevel in the J=1 second intermediate state has zero population of even mass Zr atoms, the J=0 third intermediate state will similarly be devoid of even mass Zr atoms in its sole m=0 magnetic sublevel.

The present invention makes use of hyperfine interactions present in odd mass Zr atoms to establish a different set of sublevels and transition strengths which lead to an isotropic, or nearly isotropic, population distribution in the J=1 second intermediate state. Zirconium 91 has nuclear spin I=5/2 and hyperfine interaction constants have been reported in the range of 5 to 300 MHz. For the excitation scheme shown in FIG. 1, the strength of the hyperfine interactions in the transition from the first intermediate state to the second intermediate state is comparable to the strength of the electric dipole interactions, and transition strengths and sublevel populations are described in the IJFM basis by:

$$P(F,M) \propto \begin{pmatrix} F & 1 & F \\ -M & 0 & M \end{pmatrix}^2 (2F+1)(2F+1) \begin{Bmatrix} J & 1 & J \\ F & I & F \end{Bmatrix}^2 P(F,M) \quad (II)$$

Figure 3:
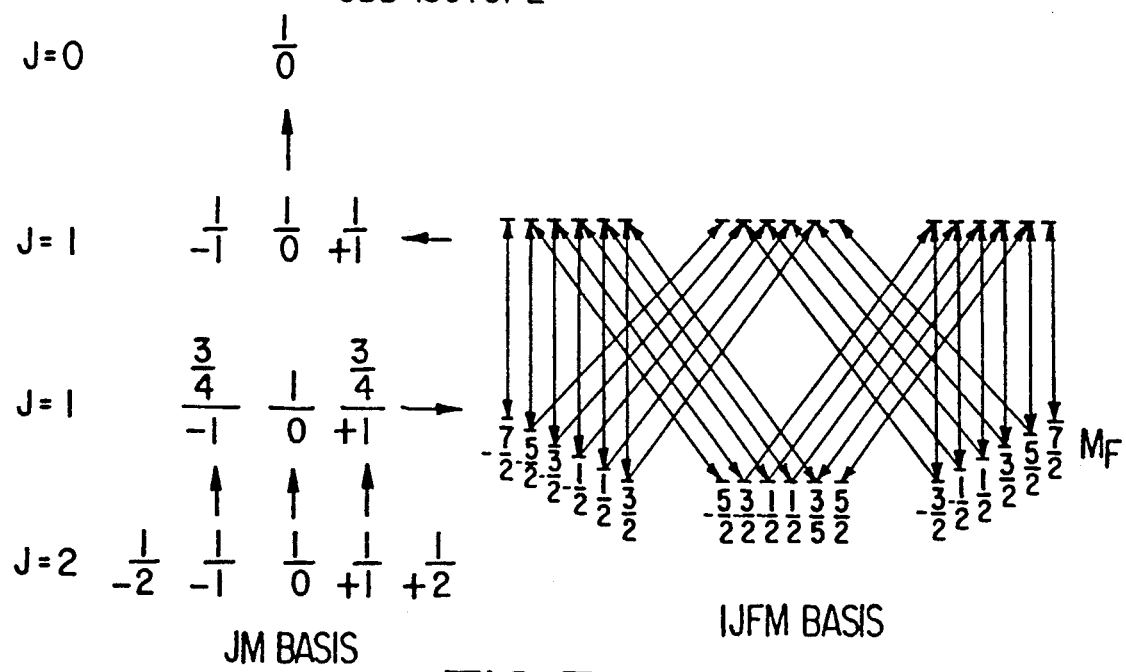
FIG. 3 is an energy level and transition diagram applicable to odd isotopes useful in explaining the present invention.

FIG. 3 shows schematically in both the JM basis and the IJFM basis, as appropriate, the sublevels associated with each of the energy states through which the odd mass Zr atoms are excited before ionization in the process of the present invention. FIG. 3 assumes that the JM basis is appropriate for the transition from the ground state to the J=1 first intermediate state. The selectivity of the process is not significantly changed if the IJFM basis is used for this transition.

As shown in FIG. 3, hyperfine interactions yield a population of $^{91}$Zr atoms distributed over 18 sublevels in the J=1 first intermediate state and the J=1 second intermediate state. The many cross-linkages between the J=1 first intermediate state and the J=1 second intermediate state leave no sublevel of either state inaccessible. Transformation of the population distribution in the J=1 second intermediate state from the IJFM basis to the JM basis yields an essentially isotropic distribution over the −1, 0 and +1 magnetic sublevels of the J=1 second intermediate state as shown in FIG. 3. This transformation is appropriate because the hyperfine interactions in the transition from the J=1 second intermediate state to the J=0 third intermediate state are believed to be weak.

The resultant population of odd mass Zr atoms in the m=0 sublevel of the J=1 second intermediate state allows excitation to the J=0 third intermediate state and subsequent photoionization of odd mass Zr atoms.

In order to identify and evaluate the characteristics of the excitation path of the present invention and to evaluate the process of the present invention, the experimental apparatus described below was used.

Zirconium atomic vapours were generated thermally by resistive heating of a rhenium filament onto which 0.7 mg of Zr metal was spot welded. The filament was mounted in an ion source chamber of a 5 m time-of-flight mass spectrometer. The resolution of the mass spectrometer for Zr was typically 500. Filament temperatures of about 1800° were used to generate the atomic vapour densities for ion counting detection. The ion source electrode voltages were adjusted to reduce thermal ionization signals to negligible levels.

Two Lumonics Model Hyperdye 300 tunable dye lasers pumped by an Oxford Model CU 40 copper vapour laser were used for resonance excitation. The copper vapour laser was operated at 5.0 KHz with unstable resonator optics and after beam telescoping and splitting, delivered a power of about 10 watts of green light (510 nm) to the oscillator cell of each dye laser. A second 8 watt resistively heated copper vapour laser was used to pump a third dye laser. Two of the dye lasers were charged with rhodamine 590 dye, and the third with rhodamine 575. The dye lasers delivered pulse energies of about 4 uJ over bandwidths (FWHM) of about 0.05 cm$^{-1}$. Laser pulses were about 10–15 ns in duration. A Stanford Research Systems digital generator was used to control and synchronize the copper vapour lasers. The yellow output (578 nm) of one of the copper vapour lasers was used for ionization.

The dye circulation was modified to provide a high flow rate of about 7 L/min with minimal vibrations. A 3.7 L stainless steel reservoir was installed in the flow lines, one on each side of the pump. All flow lines were made from 0.5 in o.d. teflon tubing and the dye laser oscillator cells were bored out to allow unrestricted flow of the dye through the dye cell walls. The resultant dye flow was very smooth and bubble free as well as being fast enough for copper vapour laser pumping. The dye was water cooled to avoid rapid degradation. With careful alignment of the lasers, bandwidths of 0.04 cm$^{-1}$ were obtained with excellent line stability. The laser beams were linearly polarized and the plane of polarization rotated using $\lambda/2$ birefringement plates. The laser beams were focussed to about 0.1 mm diameter in the ion source and the photoionization zone was estimated to be about 4 mm in length.

Laser induced fluorescence (LIF) spectra of $I_2$ were recorded for wavelength calibration and selection. The LIF signals were generated by directing 5% of the laser beam to a cell which contained 0.2 torr of $I_2$ and which was equipped with a Hamamatsu R106 photomultiplier detector. Iodine LIF and Zr resonance ionization spectra were monitored with a Stanford Research Systems SR 250 boxcar averager and stored. Both types of spectra were useful for precisely setting the laser wavelengths to the transitions used.

Photoionization signals were recorded by a fast Galileo Model FTD 2003 detector in the pulse counting mode. A multi-channel gated pulse counting system was used for simultaneous counting of mass 90, 91 and 92 isotopes and for background measurement. Gate widths were set to 200 ns and count durations were set to 10$^6$ copper vapour laser pulses to obtain sufficient counting precision. The background was monitored near mass 88. The count totals ranged between 100 and 5000 per isotope.

The first and second intermediate states shown in FIG. 1 are known J=1 states for zirconium as described in Atomic Energy Levels, C. E. Moore, Circular of the National Bureau of Standards, No. 467, 1949. A series of previously unidentified high lying states, from which were selected appropriate third intermediate states useful in the present invention, were discovered by scanning a dye laser over the frequency range of R590 dye and assigning energies to the identified high lying states by the method described in Smyth et al., J. Phys. B24, 1991, pp. 4887–4900. Table 1 lists ten high lying states that were discovered and the J value determined for three of the states.

TABLE I

| E (cm$^{-1}$) | J |
|---|---|
| 52161.0 | |
| 52168.0 | |
| 52174.1 | 1 |
| 52278.0 | |
| 52287.5 | |
| 51939.1 | |
| 52076.1 | |
| 52057.8 | |
| 52502.2 | 1 |
| 52604.5 | 0 |

The J value of each state was determined by rotation of the relative polarizations of the second and third resonant lasers and measuring the even Zr signal as a function of the relative polarization angle and comparing this result to that predicted by Equation I.

Figure 6:
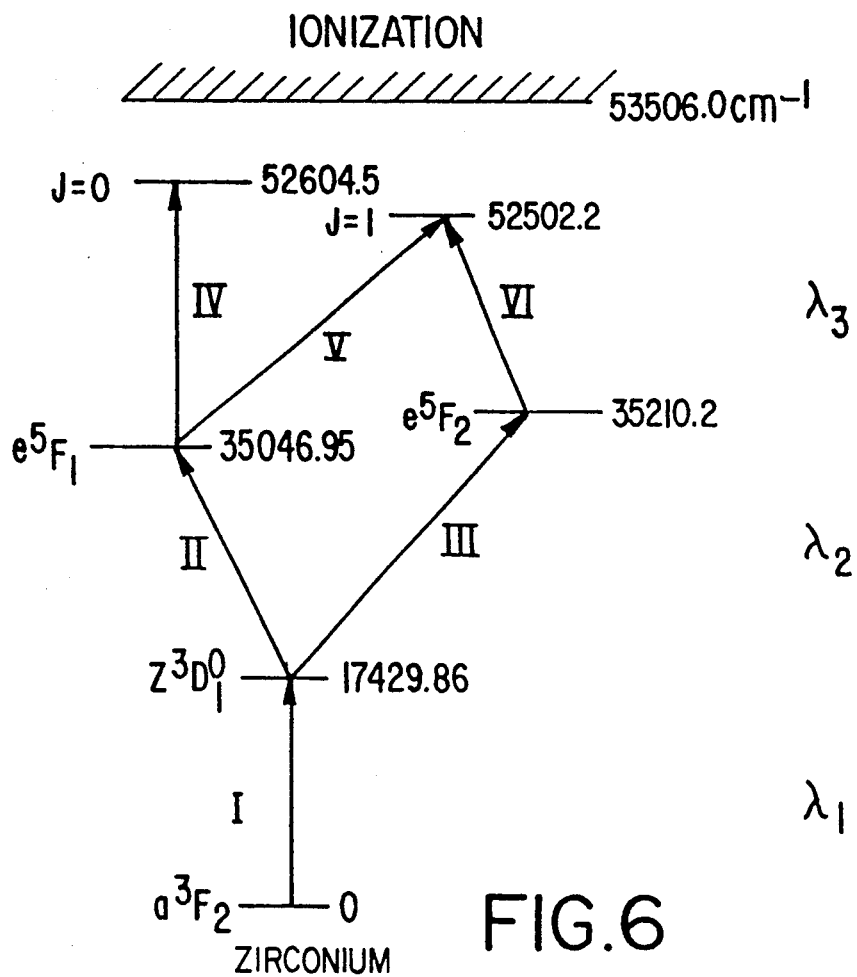
FIG. 6 is an energy level and transition diagram for three excitation paths useful in explaining the present invention.

The experimental apparatus described above was used to evaluate the characteristics of two excitation paths within the scope of the present invention and one alternative excitation path. FIG. 6 is a schematic representation of two excitation paths of the present invention (I-II-IV and I-II-V) and one alternative excitation path (I-III-VI) that were studied.

Excitation path I-II-IV of the present invention is that described in FIG. 1 and makes use of the previously unidentified high lying J=0 state at 52604.5 cm$^{-1}$ as the third intermediate state. F> citation path I-II-V and the present invention makes use of the previously unidentified high lying J=1 state at 52502.2 cm$^{-1}$. Excitation path I-III-VI, which was studied for the purpose of comparison, makes use of a J=2 state at 35210.2 cm$^{-1}$ as shown in FIG. 6.

In excitation path I-II-IV, the odd mass Zr atom population is essentially isotropically distributed among the magnetic sublevels of the J=1 second intermediate state due to hyperfine interactions, and is not substantially dependent on relative polarization angle of the second and third resonant lasers. Assuming uniform sublevel populations of $^{91}$Zr and applying equation I, a plot of the $^{90}$Zr/$^{91}$Zr and $^{92}$Zr/$^{91}$Zr ratios will describe sin$^2$ curves.

Figure 4:
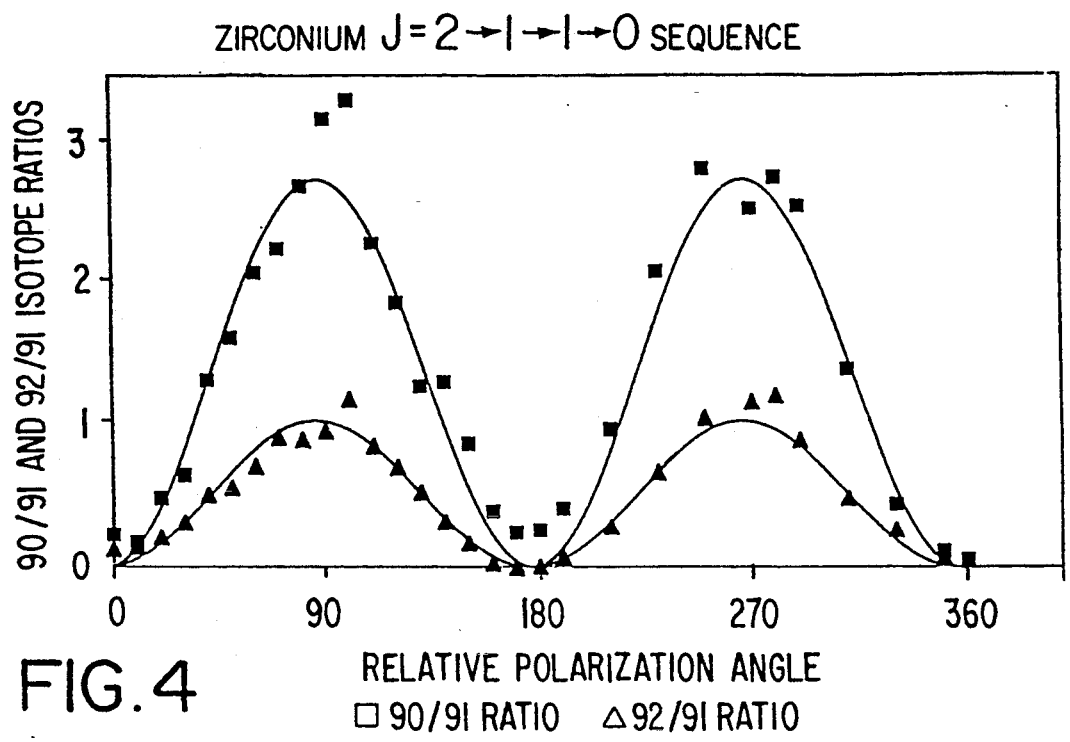
FIG. 4 is a graph of even/odd isotope ratios plotted as a function of polarization angle for an excitation path of the present invention.

The plotted points in FIG. 4 represent the experimentally measured values of $^{90}$Zr/$^{91}$Zr and $^{92}$Zr/$^{91}$Zr as a function of relative polarization angle of the second and third resonant laser pulses using the I-II-IV excitation path of the present invention shown in FIG. 6. The experimental results show a sin$^2$ curve with heavy suppression of the $^{90}$Zr signals at parallel laser polarizations (0° and 180°) confirming that the intermediate state at 52604.5 wavenumbers is a J=0 state. The observed functional dependence on relative polarization angle agrees with that predicted by Equation I and with the assumption that there is negligible polarization dependence in the odd isotopes. As can be seen from the results in FIG. 4, at parallel laser polarization, the excitation path described in FIG. 1 produces a very large single state $^{91}$Zr separation factor (greater than ten) reducing the isotopic ratio of $^{90}$Zr/$^{91}$Zr from its natural abundance of 4.6 down to well below 0.5.

Figure 5:
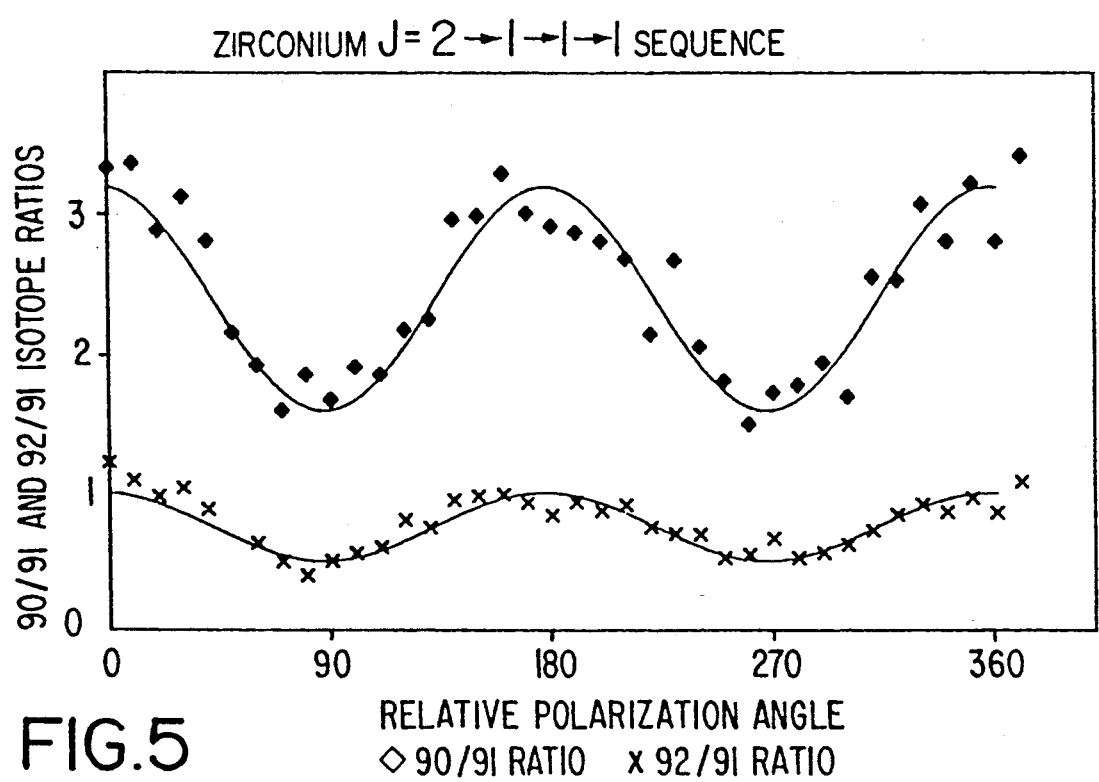
FIG. 5 is a graph of even/odd isotope ratios plotted as a function of polarization angle for an alternate excitation path of the present invention.

The experimental results using the high lying state at 52502.2 wavenumbers identified in Table I as the third intermediate state (I-II-V) showed a somewhat lower, but still useful, separation factor. The plotted points in FIG. 5 represent the experimentally measured values of $^{90}Zr/^{91}Zr$ and $^{92}Zr/^{91}Zr$ as a function of relative polarization angle of the second and third resonant lasers using the J=1 third intermediate state at 52502.2 wavenumbers. The experimental results display a $(1+\cos^2)$ function and show about a two-fold change in the even isotope ionization signal between parallel and perpendicular polarizations as predicted from equation I, confirming that the state at 52502.2 wavenumbers is a J=1 state and not a J=0 state. As can be seen from the results in FIG. 5, at perpendicular laser polarization, the use of the J=1 third intermediate state at 52502.2 wavenumbers is effective to reduce the $^{90}Zr/^{91}Zr$ ratio from its natural abundance of 4.6 down to about 1.8, a separation factor of slightly less than about 3.

It has been found experimentally that a reduction in selectivity will occur if the second and third resonant laser pulses are allowed to overlap in time. Accordingly, for maximum selectivity, the second and third resonant laser pulses should be temporally resolved. For excitation paths I-II-IV and I-II-V of the present invention, the hyperfine interaction in transition II is sufficiently strong to produce an isotropic or nearly isotropic, odd isotope population distribution prior to the end of the 15 ns second resonant laser pulse. Accordingly, for those excitation paths no delay period between the second and third resonant laser pulses is required for maximum selectivity so long as the pulses are temporally resolved.

It has been found that the use in accordance with the process of the invention of the transition from the J=1 first intermediate state to the J=1 second intermediate state produces unexpected enhancement in selectivity. As shown in FIG. 4 the $^{90}Zr/^{91}Zr$ ratio at the maxima is about 2.6, which is significantly lower than the predicted $^{90}Zr/^{91}Zr$ ratio of 7.2, based on Equation I, and assuming an isotropic population distribution in the odd isotope.

The expected and experimentally observed maximum $^{90}Zr/^{91}Zr$ ratios for the three excitation schemes represented in FIG. 6 are shown in Table II. The data in Table II correspond to a relative polarization angle of 90° for the first and second resonant laser pulses. The perpendicular orientation of the first and second laser pulses was chosen for ease of combining laser beams and has only a slight effect on selectivity.

TABLE II

| Excitation Scheme | Maximum $^{90}Zr/^{91}Zr$ Ratio | |
| (FIG. 5) | Expected* | Observed |
| --- | --- | --- |
| I-II-IV | 7.2 | 3.2 ± 0.5 |
| I-II-V | 7.2 | 3.2 ± 0.5 |
| I-III-VI | 8.2 | 5.2 ± 0.7 |

*assumes no alignment in $^{91}Zr$.

The results in Table II show significantly better than expected selectivity in excitation paths which include transition II from the J=1 first intermediate state to the J=1 second intermediate state.

This enhanced selectivity manifests itself at all relative polarization angles of the second and third laser pulses. While parallel polarization in the case of a J=0 third intermediate state, and perpendicular polarization, in the case of a J=1 third intermediate state, will in theory completely suppress ionization of the even isotopes, in practice significant even isotope ionization also occurs. Departures from parallel or perpendicular in the laser polarization angle, field interferences and coherences, however slight will cause some redistribution of even isotope population from the m=−1, and m=+1 sublevels into the m=0 sublevel of the J=1 second intermediate state, which will, along with the odd isotope population, be excited to the third intermediate state and subsequently ionized, thereby reducing selectivity. In these circumstances, the selectivity can be improved by the use of an excitation path which includes transition II from the J=1 first intermediate state to the J=1 second intermediate state.

Figure 7:
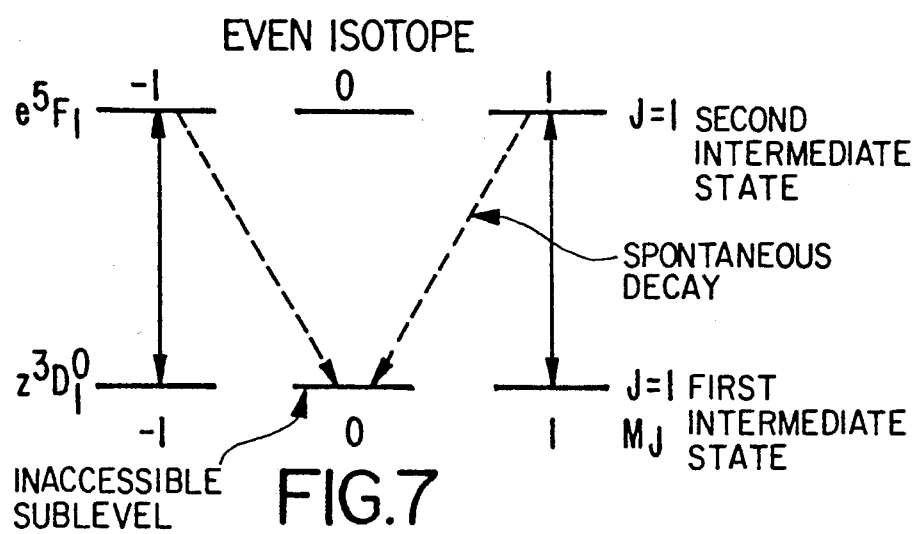
FIG. 7 is a schematic representation of the population trapping phenomenon.

It is believed that this selectivity enhancement in excitation schemes, which includes transition II from the J=1 first intermediate state to the J=1 second intermediate state is due to population trapping of the even isotope by spontaneous decay to the inaccessible m=0 sublevel of the J=1 first intermediate state, thereby reducing the even isotope photoionization rate. This is schematically illustrated in FIG. 7 which is representative of the transition from the J=1 first intermediate state to the J=1 second intermediate state.

Unlike the laser induced transitions, spontaneous decay has equal probability for all polarizations, including the circular polarizations which couple the upper m=+1 and m=−1 states to the lower m=0 state. The J=1 second intermediate state at 35046.95 cm$^{-1}$, with an experimentally determined lifetime of approximately 13 ns, will undergo substantial decay to the inaccessible m=0 sublevel of the J=1 first intermediate state, during the laser pulse. This population remains trapped, because of the relatively long lifetime of the J=1 first intermediate state, experimentally determined to be greater than or equal to about 230 ns. However, decay to the m=+1 and m=−1 sublevels of the J=1 first intermediate state is overwhelmed by the rapid population oscillations between m=1 levels (shown in FIG. 7), as indicated by the Rabi frequency, experimentally determined to be in the order of 1 GHz. These rapid transitions cause a continual feed of the total population from the m=+1 and m=−1 levels of both J=1 intermediate states to the m=0 level of the J=1 first intermediate state, during the pulse. For the odd isotopes, hyperfine interactions introduce slight splittings in the sublevels, and new linkages as shown in FIG. 3. In the case of transition II from the J=1 first intermediate state to the J=1 second intermediate state, all odd-isotope sublevels are accessible. The strong coupling via the new linkages effectively produces an isotropic population distribution of odd isotopes in the J=1 second intermediate state. The net result is a reduced even isotope photoexcitation rate relative to the odd and therefore enhanced selectivity. Decay after the pulse, and to other atomic levels, need not be considered because it is the same for both isotopes.

In excitation paths that do not include strong hyperfine interactions, as in transition II, between the first and the second intermediate states, this selectivity enhancement does not occur. For the I-III-VI excitation path shown in FIG. 6, which included a transition from the J=1 first intermediate state to a J=2 second intermediate state at 35210.2 cm$^{-1}$, a $^{90}Zr/^{91}Zr$ ratio of 8.2 was initially expected as shown in Table II. However, the $^{91}Zr$ isotope showed evidence of strong alignment, even after 30 ns of delay between the second and third laser pulses, indicating that the hyperfine interaction was relatively weak for this transition. Consequently, the expected isotope ratio should be close to natural (4.6) since, in the absence of strong hyperfine interaction, the alignment in the even isotope is followed closely by that in the odd. The experimentally observed results in Table II are in general agreement with this revised expectation.

To implement the process of the present invention, laser sources and ion vapour separating apparatus known in the art may be used, such as those used in known AVLIS processes and described briefly above.

The foregoing description of the preferred embodiments of the invention is provided for purposes of illustration and description and is not intended to limit the invention to the precise embodiments disclosed. It is intended that the scope of the invention be defined by the claims appended hereto.

What is claimed is:

1. A method for selectively photoionizing odd mass Zr atoms in a vapour comprising odd and even mass Zr atoms, comprising the steps of:
   irradiating said vapour with a linearly polarized resonant first laser pulse at a wavelength effective to raise the energy of Zr atoms from the $J=2$ ground state to a $J=1$ first intermediate state;
   irradiating said vapour with a linearly polarized resonant second laser pulse at a wavelength effective to raise the energy of Zr atoms by a transition from said $J=1$ first intermediate state to a $J=1$ second intermediate state in which the $m=0$ sublevel is substantially unpopulated with even mass Zr atoms, said transition having sufficient hyperfine interaction to establish a substantially isotropic population distribution of odd mass Zr atoms among the magnetic sublevels of said $J=1$ second intermediate state;
   irradiating said vapour with a linearly polarized resonant third laser pulse at a wavelength effective to raise the energy of Zr atoms from said $J=1$ second intermediate state to a third intermediate state;
   irradiating said vapour with electromagnetic radiation effective to ionize Zr atoms in said third intermediate state.

2. The method according to claim 1 wherein the $J=1$ first intermediate state is at 17429.86 cm$^{-1}$ and the $J=1$ second intermediate state is at 35046.95 cm$^{-1}$.

3. The method according to claim 1 wherein the third intermediate state is a $J=0$ state.

4. The method according to claim 3 wherein the axis of polarization of said third laser pulse is substantially parallel to that of said second laser pulse.

5. The method according to claim 3 wherein the $J=0$ third intermediate state is at 52604.5 cm$^{-1}$.

6. The method according to claim 1 wherein the $J=1$ first intermediate state is at 17429.86 cm$^{-1}$, the $J=1$ second intermediate state is at 35046.95 cm$^{-1}$, the third intermediate state is a $J=0$ state at 52604.5 cm$^{-1}$, and the axis of polarization of said third laser pulse is substantially parallel to that of said second laser pulse.

7. The method according to claim 6 wherein the second and third laser pulses are resolved in time.

8. The method according to claim 6 wherein each of the first, second and third laser pulses has a duration of 10 to 15 ns.

9. The method according to claim 1 wherein the third intermediate state is a $J=1$ state.

10. The method according to claim 9 wherein the axis of polarization of said third laser pulse is substantially perpendicular to that of said second laser pulse.

11. The method according to claim 9 wherein the $J=1$ third intermediate state is at 52502.2 cm$^{-1}$.

12. The method according to claim 1 wherein the $J=1$ first intermediate state is at 17429.86 cm$^{-1}$, the $J=1$ second intermediate state is at 35046.95 cm$^{-1}$, the third intermediate state is a $J=1$ state at 52502.2 cm$^{-1}$, and the axis of polarization of said third laser pulse is substantially perpendicular to that of said second laser pulse.

13. The method according to claim 12 wherein the second and third laser pulses are resolved in time.

14. The method according to claim 1 wherein each of the first, second and third laser pulses has a duration of 10 to 15 ns.

15. The method according to claim 1 wherein said electromagnetic radiation is derived from a laser source.

16. A method for selectively photoionizing odd mass Zr atoms in a vapour comprising odd and even mass Zr atoms comprising the steps of:
   irradiating said vapour with a linearly polarized first laser pulse at a wavelength effective to raise the energy of Zr atoms from the $J=2$ ground state to a $J=1$ first intermediate state at 17429.86 cm$^{-1}$;
   irradiating said vapour with a linearly polarized second laser pulse at a wavelength effective to raise the energy of Zr atoms from said $J=1$ first intermediate state to a $J=1$ second intermediate state at 35046.95 cm$^{-1}$;
   irradiating said vapour with a linearly polarized third laser pulse having an axis of polarization substantially parallel to that of said second laser pulse and at a wavelength effective to raise the energy of Zr atoms from said $J=1$ second intermediate state to a $J=0$ third intermediate state at 52604.5 cm$^{-1}$;
   irradiating said vapour with electromagnetic radiation effective to ionize Zr atoms in said $J=0$ third intermediate state.

17. The method according to claim 16 wherein the second and third laser pulses are resolved in time.

18. The method according to claim 16 wherein each of the first, second and third laser pulses has a duration of 10 to 15 ns.

19. A method for selectively photoionizing odd mass Zr atoms in a vapour comprising odd and even mass Zr atoms comprising the steps of:
   irradiating said vapour with a linearly polarized first laser pulse of a wavelength effective to raise the energy of Zr atoms from the $J=2$ ground state to a $J=1$ first intermediate state at 17429.86 cm$^{-1}$;
   irradiating said vapour with a linearly polarized second laser pulse at a wavelength effective to raise the energy of Zr atoms from said $J=1$ first intermediate state to a $J=1$ second intermediate state at 35046.95 cm$^{-1}$;
   irradiating said vapour with a linearly polarized third laser pulse having an axis of polarization substantially perpendicular to that of said second laser pulse and at a wavelength effective to raise the energy of Zr atoms from said $J=1$ second intermediate state to a $J=1$ third intermediate state at 52502.2 cm$^{-1}$;
   irradiating said vapour with electromagnetic radiation effective to ionize Zr atoms in said $J=1$ third intermediate state.

20. The method according to claim 19 wherein the second and third laser pulses are resolved in time.

21. The method according to claim 19 wherein each of the first, second and third laser pulses has a duration of 10 to 15 ns.

* * * * *

UNITED STATES PATENT AND TRADEMARK OFFICE
CERTIFICATE OF CORRECTION

PATENT NO. : 5,316,635

DATED : May 31, 1994

INVENTOR(S) : Lawrence W. Green et al.

It is certified that error appears in the above-identified patent and that said Letters Patent is hereby corrected as shown below:

In the abstract, line 3, please delete "are" and insert --one--;

In the abstract, line 5, please delete "J=(" and insert --J=1 --.

Column 8, line 36, please delete "F> citation" and insert --Excitation--.

Signed and Sealed this

Eleventh Day of October, 1994

BRUCE LEHMAN

Attest:

Attesting Officer

Commissioner of Patents and Trademarks